(12) United States Patent
Van Stensel

(10) Patent No.: US 8,924,780 B2
(45) Date of Patent: Dec. 30, 2014

(54) METHOD OF PROVIDING HIGH INTEGRITY PROCESSING

(75) Inventor: Jonathan Paul Van Stensel, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 216 days.

(21) Appl. No.: 13/293,501

(22) Filed: Nov. 10, 2011

(65) Prior Publication Data

US 2013/0124922 A1 May 16, 2013

(51) Int. Cl.
  *G06F 11/00* (2006.01)
  *G06F 11/16* (2006.01)
(52) U.S. Cl.
  CPC ........ *G06F 11/1633* (2013.01); *G06F 11/1675* (2013.01)
  USPC ............................................. 714/11; 714/10
(58) Field of Classification Search
  USPC ............................. 714/10–12, 37
  See application file for complete search history.

(56) References Cited

U.S. PATENT DOCUMENTS

| | | | | |
|---|---|---|---|---|
| 6,240,526 | B1 * | 5/2001 | Petivan et al. | 714/11 |
| 6,658,621 | B1 * | 12/2003 | Jamil et al. | 714/805 |
| 7,178,058 | B2 * | 2/2007 | Tsukahara | 714/12 |
| 7,318,169 | B2 * | 1/2008 | Czajkowski | 714/17 |
| 7,987,385 | B2 * | 7/2011 | Pruiett et al. | 714/11 |
| 8,015,390 | B1 * | 9/2011 | Corcoran et al. | 712/12 |
| 2004/0153747 | A1 * | 8/2004 | Czajkowski | 714/10 |
| 2004/0193735 | A1 * | 9/2004 | Peleska et al. | 709/400 |
| 2005/0246581 | A1 * | 11/2005 | Jardine et al. | 714/12 |
| 2009/0031115 | A1 | 1/2009 | Pruiett et al. | |

FOREIGN PATENT DOCUMENTS

WO  2009015276 A2  1/2009

OTHER PUBLICATIONS

European Search Report for Counterpart EP12192080.5, Sep. 24, 2013.

* cited by examiner

*Primary Examiner* — Yolanda L Wilson
(74) *Attorney, Agent, or Firm* — McGarry Bair PC

(57) ABSTRACT

A method of providing synchronization and integrity checking in a high integrity processing system having at least two redundant processing lanes, with each lane having an application processor, with the application processors running the same application software in a non-lockstep configuration, and outputting transactions requiring access to an addressable space.

22 Claims, 19 Drawing Sheets

METHOD OF PROVIDING HIGH INTEGRITY PROCESSING

BACKGROUND OF THE INVENTION

Computer processing modules may provide high integrity and high availability at the source to ensure that faults are detected and isolated with precision and that false alarms are minimized. High integrity modules are even more important for aircraft, whereby a fault that is not promptly and accurately detected and isolated may result in operational difficulties. Conventional designs for high integrity processing systems require expensive custom circuitry in order to implement instruction level lock-step processing between two or more microprocessors on the module. Furthermore, modern microprocessors do not have the capability of running in lockstep due to increased component integration and features that introduce variability in processing time.

BRIEF DESCRIPTION OF THE INVENTION

In one embodiment, a method of providing synchronization and integrity checking in a high integrity processing system having at least two redundant processing lanes, with each lane having an application processor (AP), with the APs running the same application software in a non-lockstep configuration, and outputting transactions requiring access to an addressable space, includes outputting a first transaction from a first AP, storing the first transaction in a first buffer prior to executing the first transaction, outputting a second transaction from a second AP, comparing the first and second transactions to determine if they match, and effecting a processing of the first and second transactions in their corresponding lane when they match.

DESCRIPTION OF EMBODIMENTS OF THE INVENTION

High Integrity at the source computing currently requires at least two processing lanes running in lockstep at the instruction level, or at least two processing lanes and a monitor. If the software running on each processing lane of a module receives the same inputs (data, interrupts, time, etc.) and is able to perform the same "amount" of processing on the data before sending outputs or before receiving new inputs, then each lane will produce identical outputs in the absence of failures. In general, when the software running on a module receives inputs, the inputs must be identical on both lanes and both lanes must receive the inputs when they are in exactly the same state. When the software running on a module sends an output, the data from both lanes must be compared before it is output. In order to ensure that the output data comparison does not fail (because of improper state synchronization), the portions of the software responsible for producing the output data must reach the same state in both lanes before the outputs can be compared and then subsequently transmitted.

Figure 1:
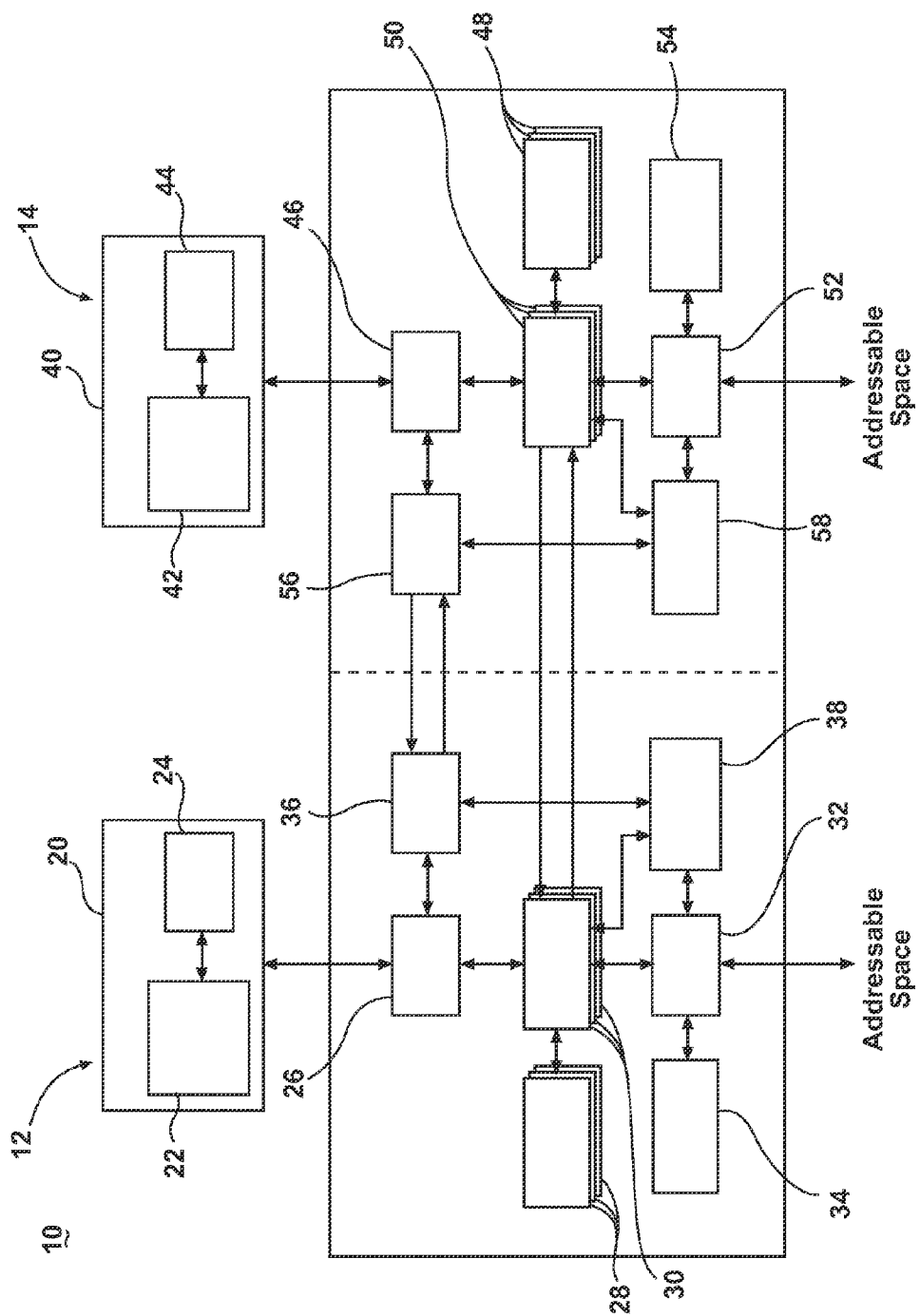
FIG. 1 is a schematic illustration of a high integrity processing system according to a first embodiment of the invention.

The embodiments of the invention provide a method of synchronization and integrity checking that does not require lockstep operation of the processors and allows for dissimilar processors. FIG. 1 illustrates a non-limiting example of a high integrity, non-lockstep processing system 10 having a first processing lane 12 and a second processing lane 14 both of which are redundant with each other according to a first embodiment of the invention. It is contemplated that the processing system 10 may have more redundant processing lanes but only two will be shown and described for clarity and ease of explanation.

As both the first processing lane 12 and the second processing lane 14 are redundant only the components of the first processing lane 12 will be described. In the second processing lane 14 like parts will be identified with like numerals increased by 20, with it being understood that the description of the like parts of the first processing lane 12 applies to the components of the second processing lane 14.

The first processing lane 12 may include a first CPU 20 having an integrated AP 22 and memory 24. A high speed interface 26 may be operably coupled to the CPU 20 and provide access thereto. It is contemplated that the high speed interface 26 may be any interface with sufficient bandwidth. By way of non-limiting example, the high speed interface may be PCI Express.

A transaction memory 28 may be included in the first processing lane 12 and may act as a buffer and store accesses to an I/O or addressable space from both CPUs 20 and 40. This may include storing both read and write access. Duplicate transaction memories 28 have been illustrated and may be included in the first processing lane 12 for redundancy purposes.

At least one data conformer 30 may be included in the first processing lane 12 and may be capable of comparing incoming and outgoing data to make sure it is identical. A plurality of data conformers 30 has been illustrated; however, only one data conformer 30 in the first processing lane 12 is necessary. In the case where there is a plurality of data conformers 30 in the first processing lane 12, the data conformers 30 may be indexed. In the case of a plurality of data conformers, both the first and second processing lanes 12 and 14 will have the same number of data conformers. The interaction between the data conformers occurs only within data conformers of the same processing lane. An I/O interface 32 may be included and may implement a connection to the addressable space or I/O.

The processing system 10 may be capable of supporting time and/or space partitioned environments on each AP. In such partitioned environments, the AP may run multiple partitions of the program/OS. A data conformer or separate transaction memory is desired for each partition on each AP to avoid the synchronization of the APs at the time of the partition switch. Furthermore, the AP may support multiple cores or multiple threads. A data conformer or separate transaction memory is needed for each independent core or thread.

In such partitioned environments a shared memory 34 may be included in the first processing lane 12 and may connect to the I/O interface 32. The shared memory 34 may include Error Correcting Code (ECC). Such a shared memory 34 may store data that requires high integrity, such as data shared between partitions. It is contemplated that the shared memory 34 could be internal or external depending on the amount of required memory. A partition timer 36 may also be included in the first processing lane 12 and may be capable of tracking time left in the partition. An optional partition switch DMA 38 may also be included in the first processing lane 12 and may be capable of retrieving data during a partition switch so the data is immediately ready for the applications. That data may then be read directly from the device rather than having to wait for I/O accesses. A partition switch may be initiated by the CPU 20 when the partition timer 36 expires.

For the sake of simplicity, the following operational discussion will be limited to the first and second processing lanes 12 and 14 each having only a single data conformer 30 and 50, respectively, and being a non-partitioned environment. The processing system 10 may perform a method of providing synchronization and integrity checking with the APs 22 and 42 running the same application software in a non-lockstep configuration, and outputting transactions requiring access to an addressable space. The addressable space may be any suitable space including by way of non-limiting examples I/O, memory, or some other space. Flags may be used with the transaction to indicate the associated process ID, whether the transaction should block all subsequent transactions, whether comparison is enabled, and whether to access redundant addressable space.

Generally, during a write operation, a first transaction may be output from the first AP 22 of the first CPU 20, the first transaction may then be stored in a first buffer prior to execution of the first transaction. A second transaction from the second AP 42 of the second CPU 40 may be output and the first and second transactions may be compared to determine if they match. In the event that the first and second transactions match, access to the addressable space corresponding to the first and second transactions may be effected. In the event that when the first and second transactions are compared they are found to not match, an error results and access is not granted to the addressable space. It is contemplated that such an error may be logged. By way of non-limiting example, the error may be logged in memory. It is further contemplated that the buffer may be flushed when the first and second transactions do not match to facilitate a restart of the system.

Generally, during a read operation, a first transaction may be output from the first AP 22 of the first CPU 20, provided that there is not a pending write to an overlapping address the access to the addressable space corresponding to the first transaction may be effected. The read data from the transaction may be verified, returned to the first CPU and stored in the second buffer. When a second transaction is output from the second AP 42 of the second CPU 40 the read transaction is verified and the verified data is returned to the second CPU. In the event that when the read data is incorrect or the first and second transactions do not match an error results and may be flagged to the first and second CPU either with or without the associated data. It is contemplated that such an error may be logged. By way of non-limiting example, the error may be logged in memory. It is further contemplated that the buffer may be flushed when the first and second transactions do not match to facilitate a restart of the system.

Figure 2A:
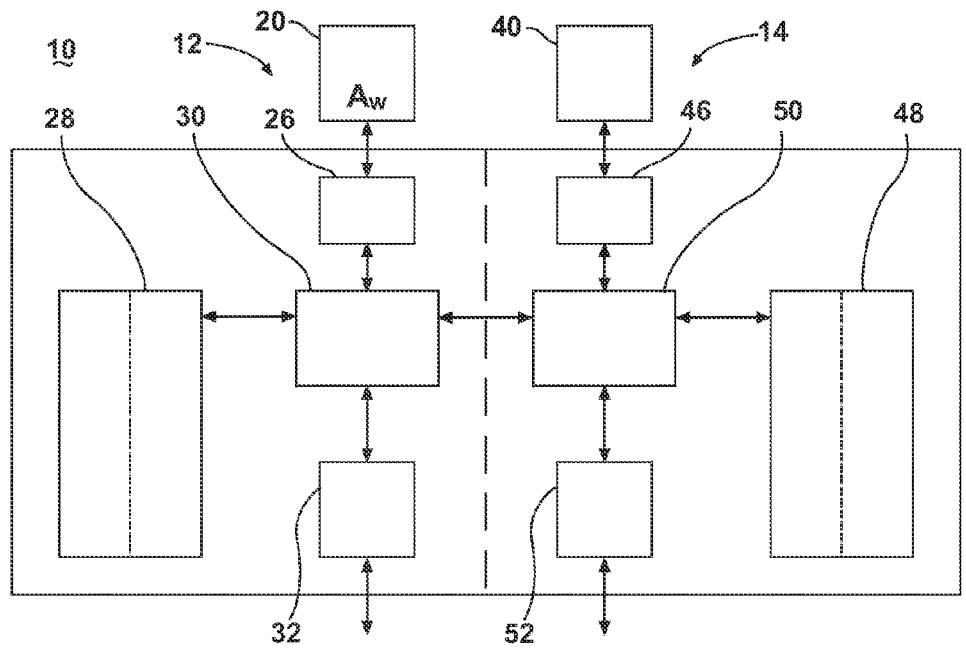
FIGS. 2A-2D schematically illustrate a portion of a method of providing synchronization and integrity checking in a high integrity processing system, according to a second embodiment.
Figure 2B:
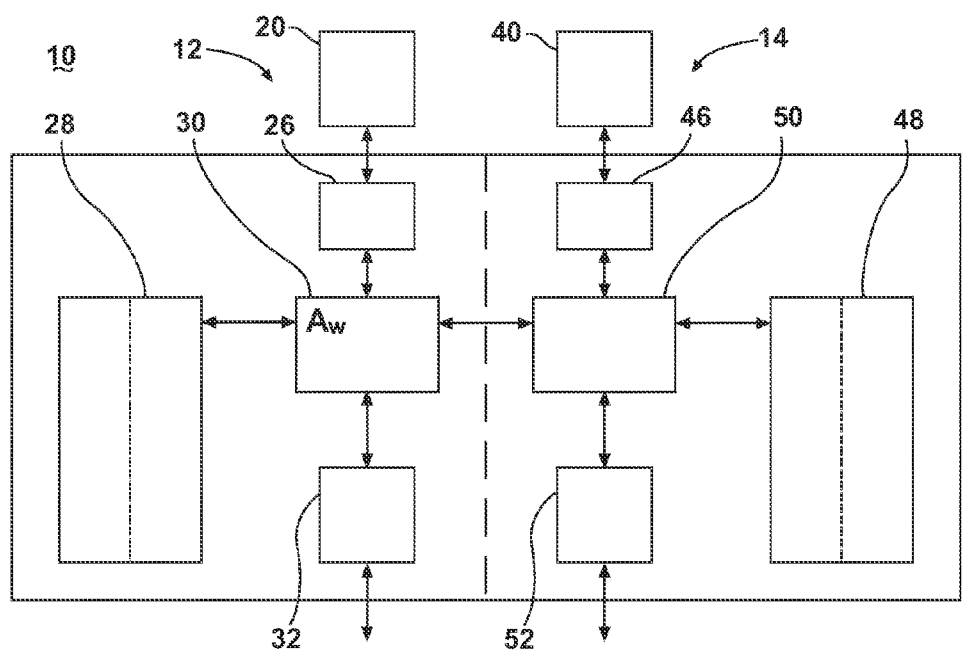
Figure 2C:
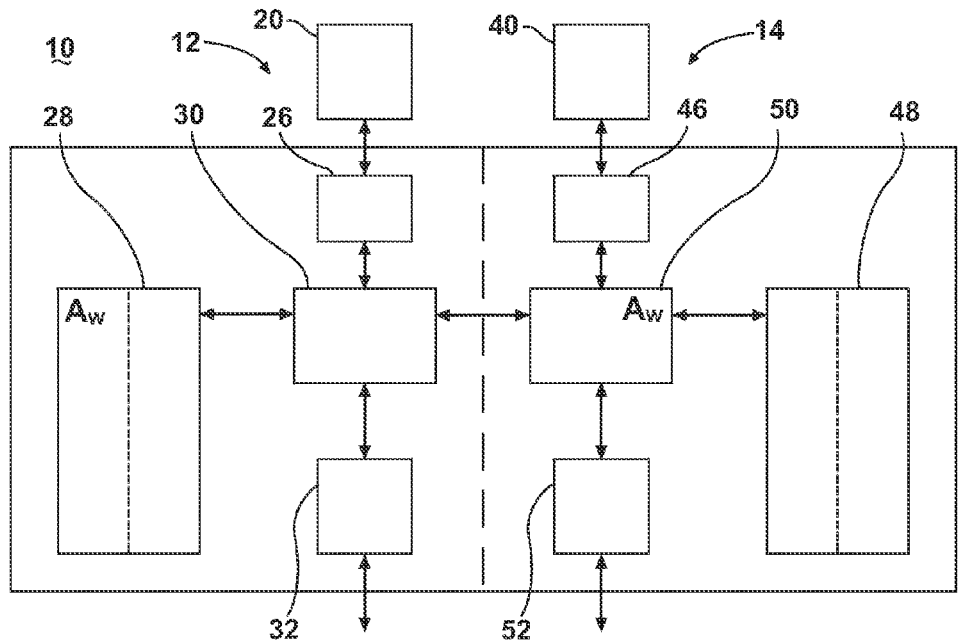
Figure 2D:
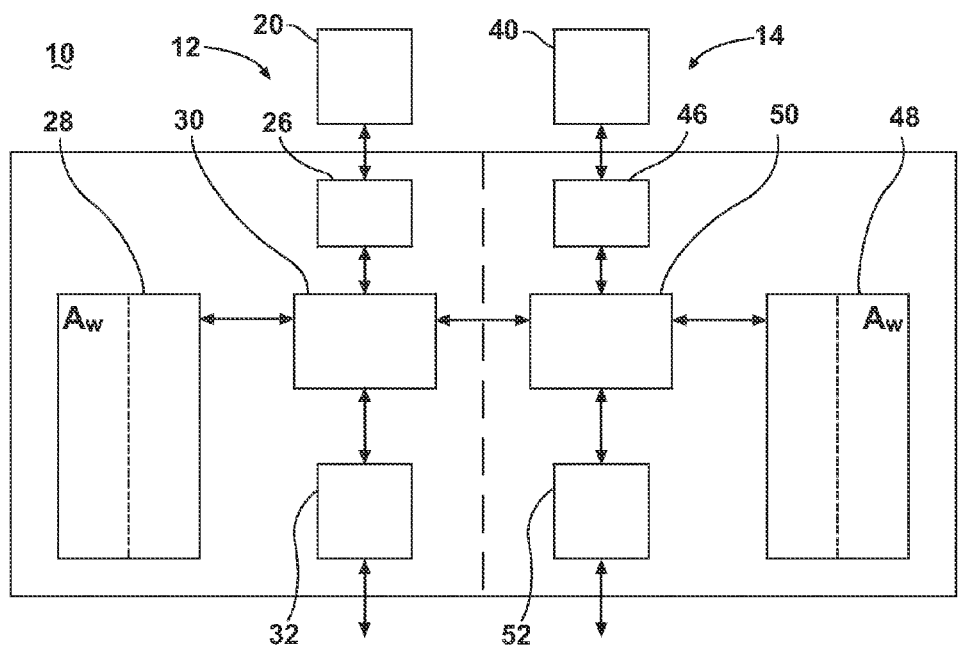

FIGS. 2A-7F illustrate an embodiment of a method of providing synchronization and integrity checking within the processing system 10. FIGS. 2A-2D illustrate the storing of the first transaction in the first and second buffers. The method may begin when the first CPU 20 generates a first transaction. In FIG. 2A, the first transaction is illustrated as transaction write access to memory location A or $A_w$. The first transaction $A_w$ may be received in the first data conformer 30 of the first processing lane 12 as illustrated in FIG. 2B. The data conformer 30 may then push the first transaction $A_w$ into the transaction memory 28 and pass the first transaction $A_w$ to the second data conformer 50 of the second processing lane 14 as illustrated in FIG. 2C. FIG. 2D shows that the data conformer 50 pushes the first transaction $A_w$ into the transaction memory 48 corresponding to the second data conformer 50. Although not illustrated, at this point a second write transaction may be received in the second data conformer as generated by the second CPU 40. The second write transaction may be passed to the first data conformer 30. The first transaction may be popped from the first and second transaction memories and may be compared with the second write transaction at the conformer to determine if they match. If the transactions do not match, then the write is terminated and the error is logged. If the transactions do match, then the data conformers 30 and 50 pass the write transactions to the I/O interfaces 32 and 52 to write the data.

Figure 3A:
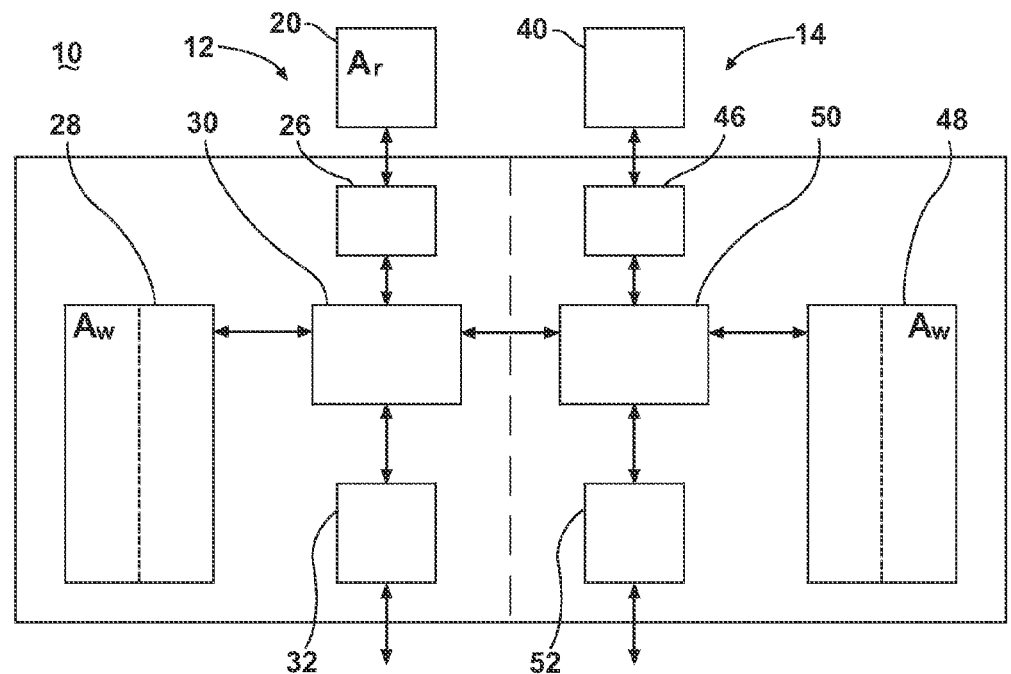
FIGS. 3A-3D schematically illustrate another portion of the method of providing synchronization and integrity checking in a high integrity processing system, according to the second embodiment.
Figure 3B:
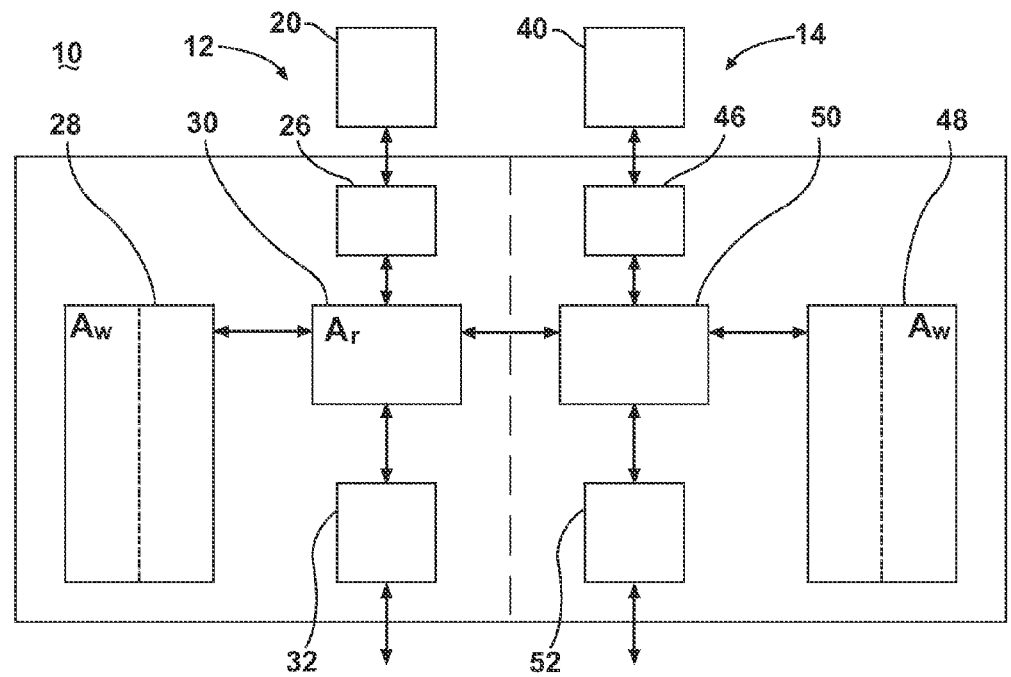
Figure 3C:
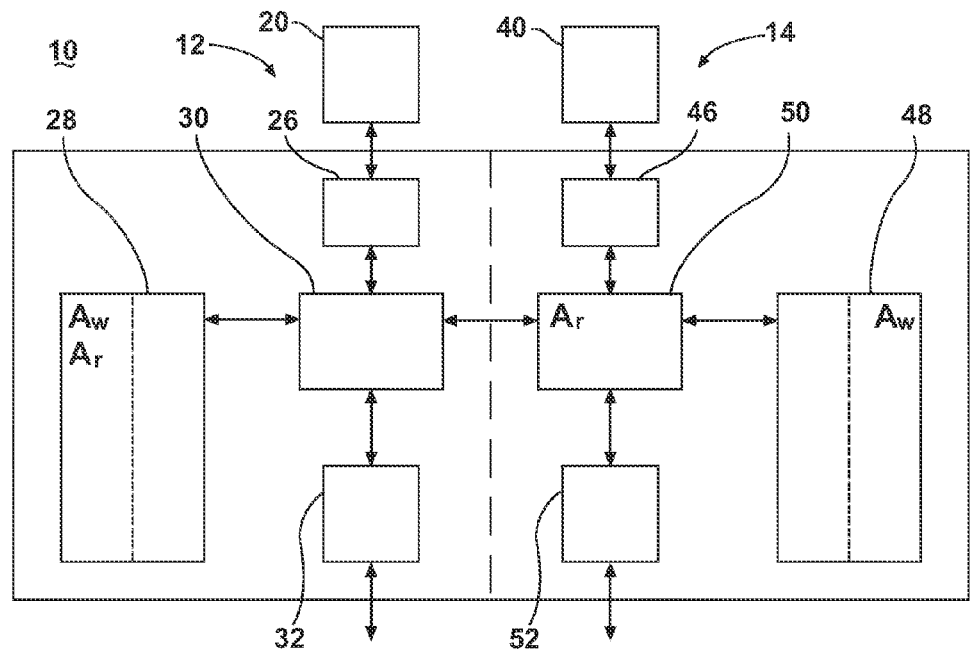
Figure 3D:
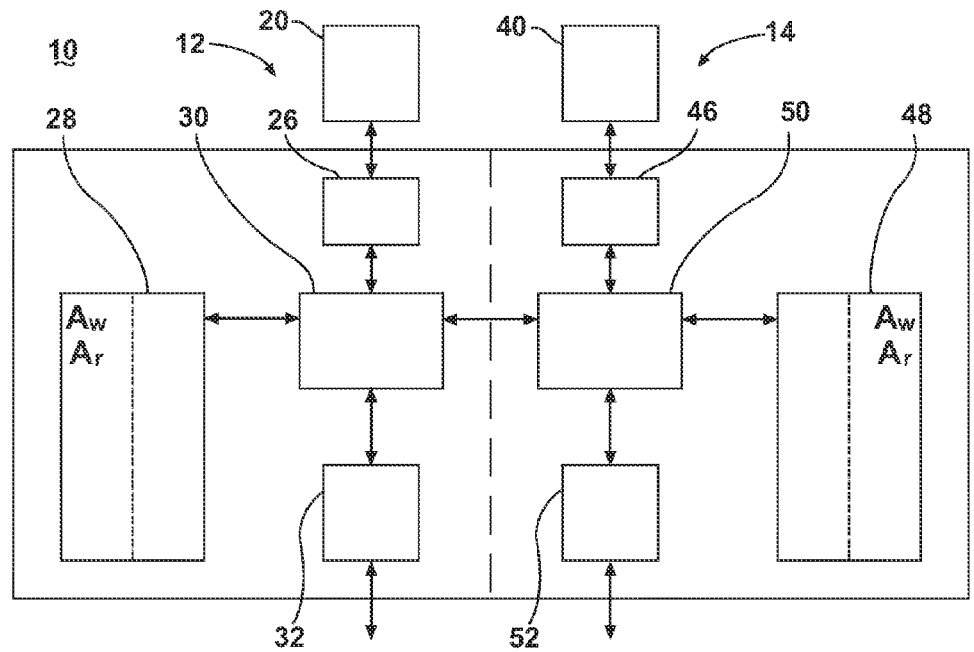

FIGS. 3A-7F illustrate an alternative scenario wherein the second transaction is a blocked read access. A blocked read access is typically a read whose address overlaps with a pending write. In FIG. 3A, the first CPU 20 may generate a second transaction that is a read access to the same address as the transaction read access, illustrated as $A_r$. The second transaction $A_r$ may be received in the first data conformer 30 of the first processing lane 12 as illustrated in FIG. 3B. Because there is an existing write to the same address in the transaction memory 28 the data conformer 30 may push the transaction $A_r$ into the transaction memory 28 behind the first transaction $A_w$ as illustrated in FIG. 3C. The data conformer 30 may pass the transaction $A_r$ to the second data conformer 50, which may then push the transaction $A_r$ into the transaction memory 48 behind the first transaction as illustrated in FIG. 3D.

Figure 4A:
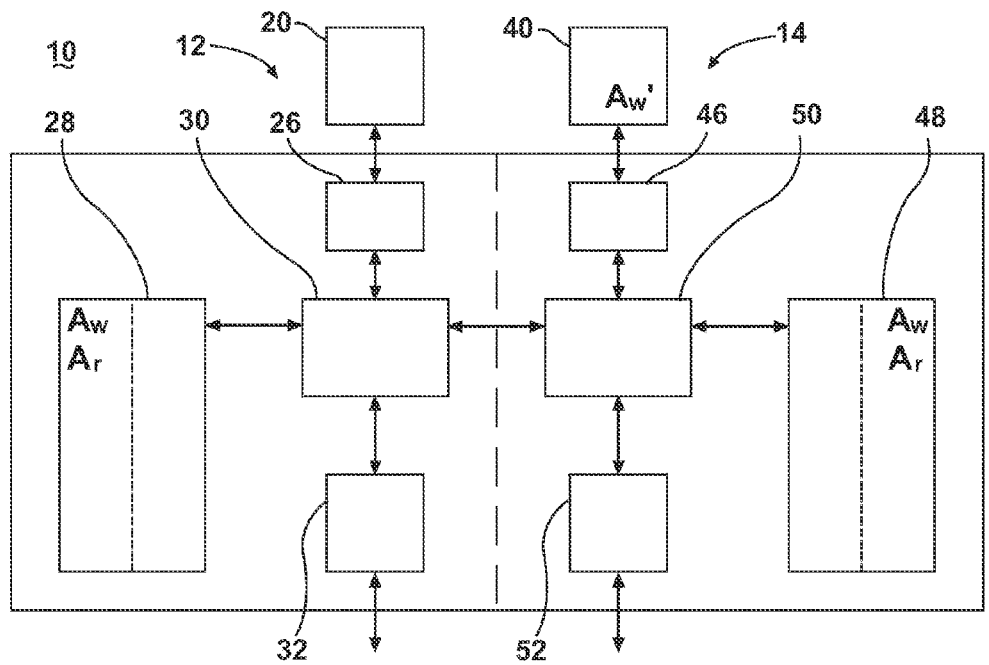
FIGS. 4A-4D schematically illustrate another portion of the method of providing synchronization and integrity checking in a high integrity processing system, according to the second embodiment.
Figure 4B:
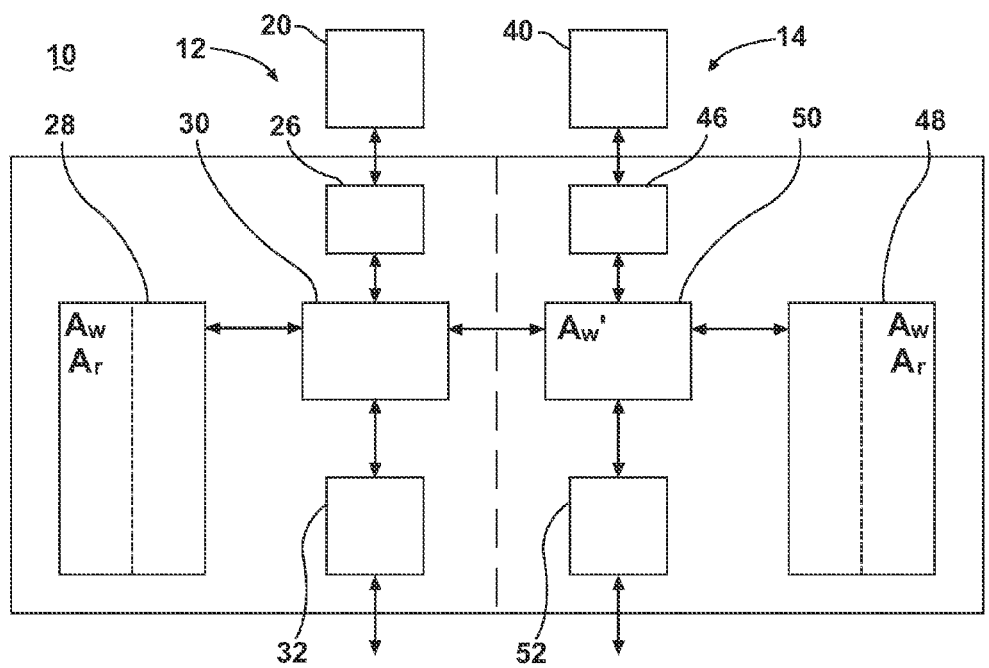
Figure 4C:
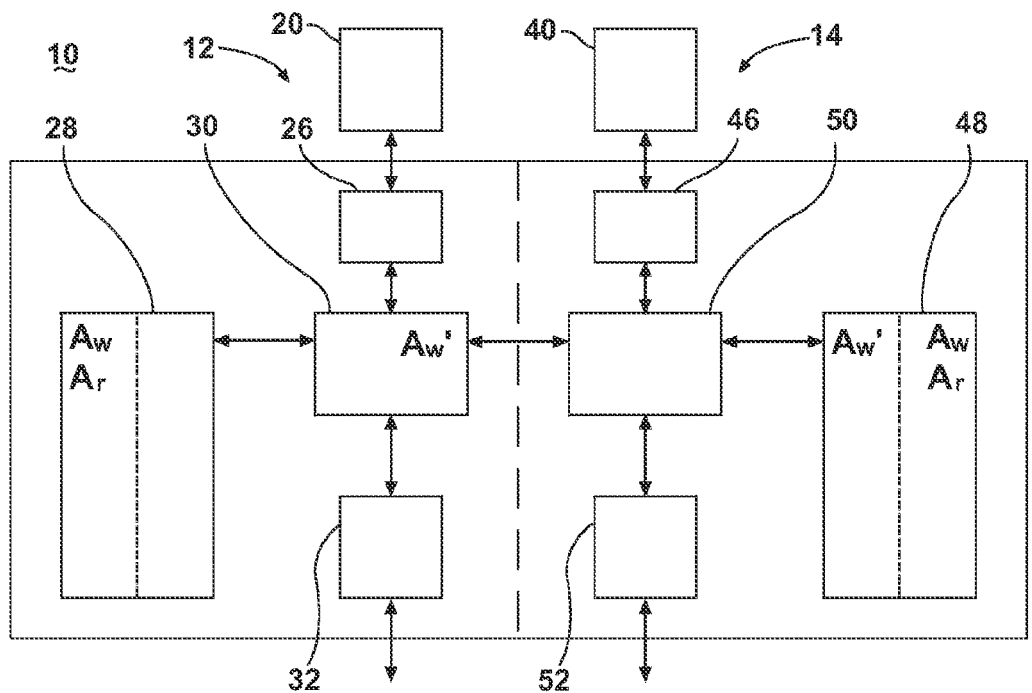
Figure 4D:
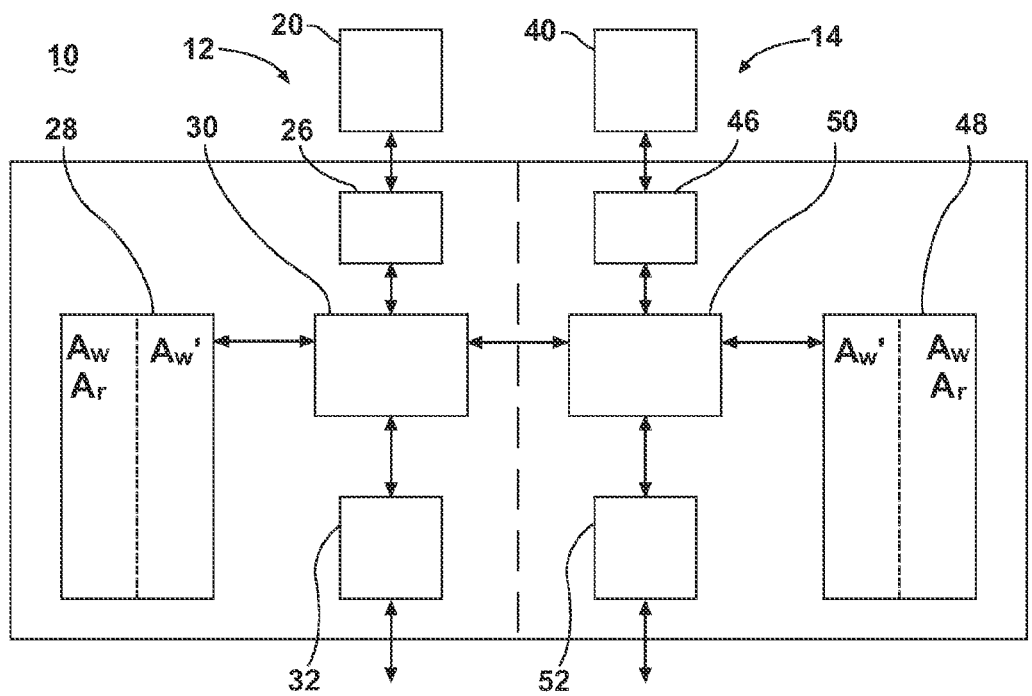

FIGS. 4A-4D illustrate a third transaction being generated and stored in the buffers. More specifically, FIG. 4A illustrates the second CPU 40 generating a third transaction, which is illustrated as a transaction write access to the same address as the first transaction or $A_w'$. The third transaction $A_w'$ is output from the second AP 42 and is received by the second data conformer 50 as illustrated in FIG. 4B. The second data conformer 50 saves the third transaction $A_w'$ in the second transaction memory 48 and passes the third transaction $A_w'$ to the first data conformer 30 as illustrated in FIG. 4C. The first data conformer 30 saves the third transaction $A_w'$ in the first transaction memory 28 as illustrated in FIG. 4D.

Figure 5A:
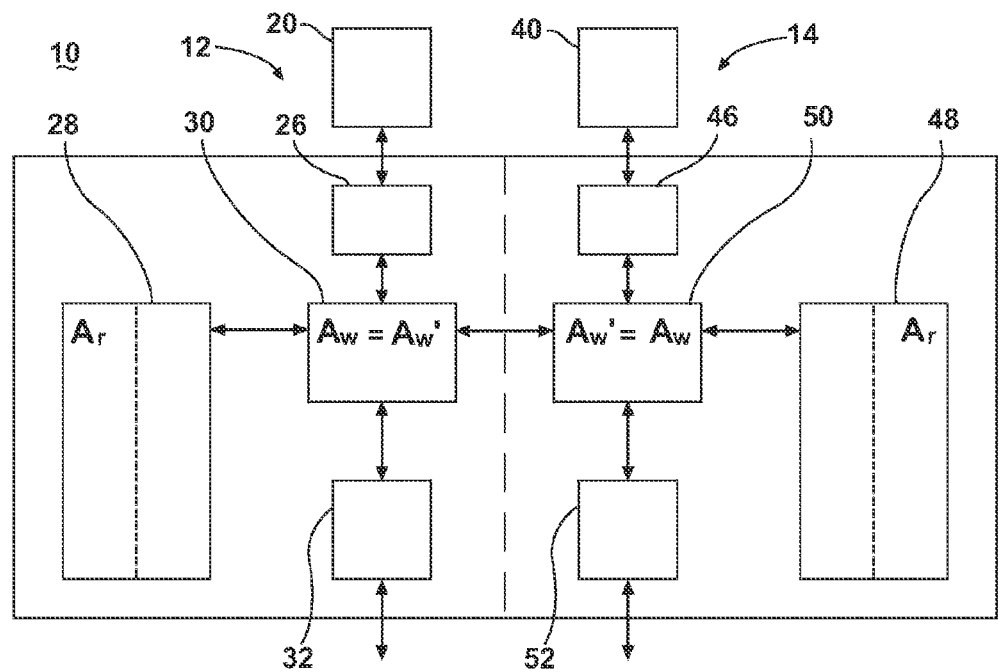
FIGS. 5A-5C schematically illustrate another portion of the method of providing synchronization and integrity checking in a high integrity processing system, according to the second embodiment.
Figure 5B:
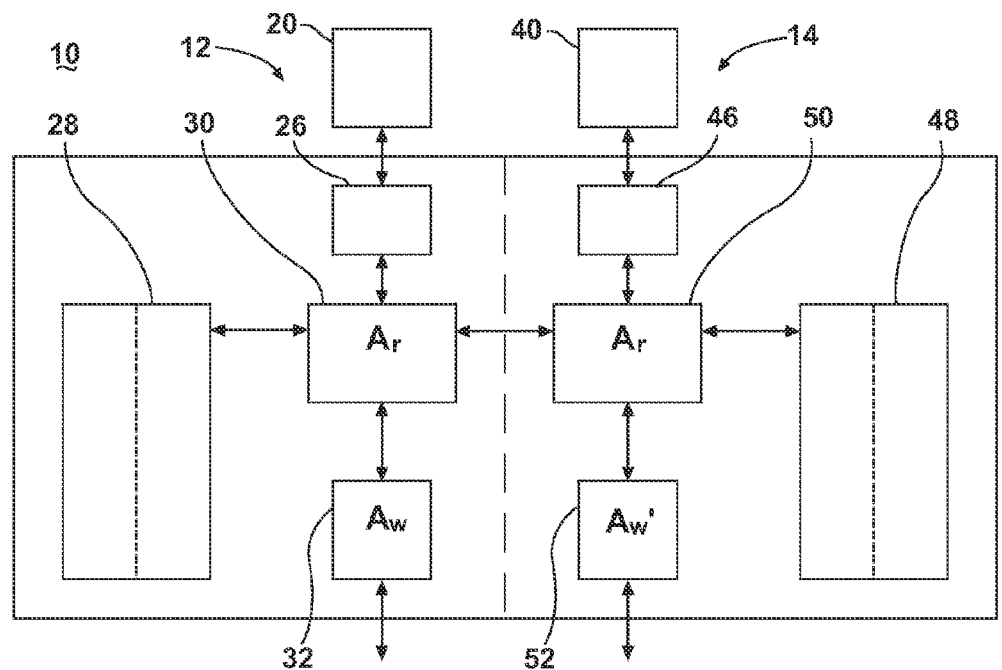
Figure 5C:
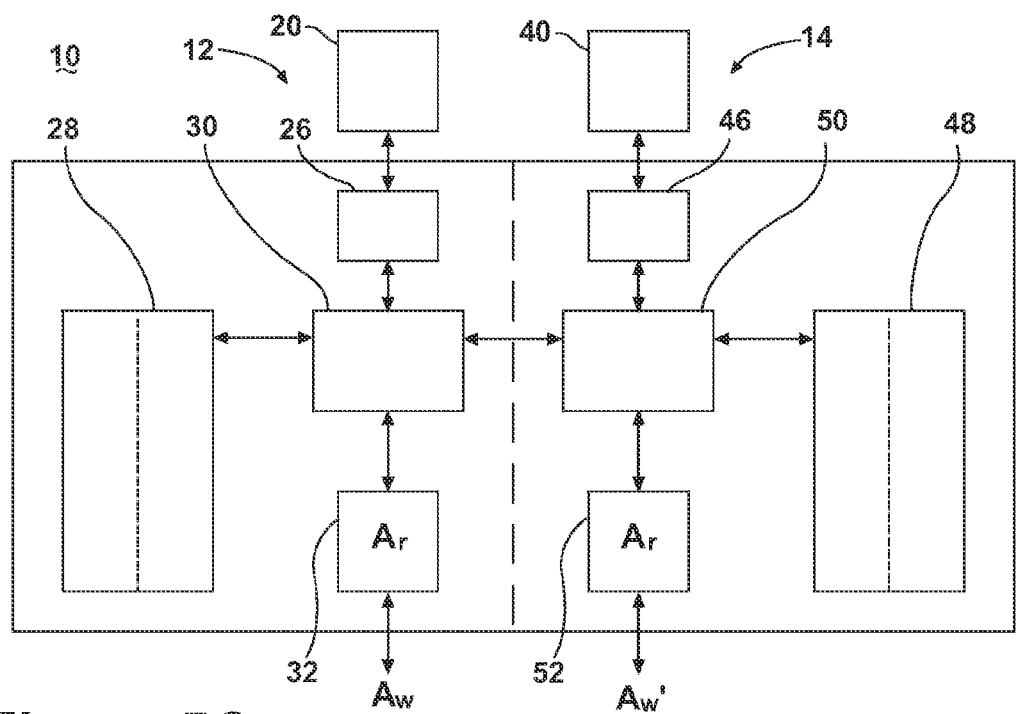

FIGS. 5A-5C illustrate the first and third transaction being compared. More specifically FIG. 5A illustrates that the first transaction $A_w$ and the third transaction $A_w'$ are popped from the first and second transaction memories 28 and 48 into the data conformers 30 and 50 where the comparison is made. If the transactions do not match, then the write is terminated and the error is logged. If the transactions do match, then the data conformers 30 and 50 pass the write transactions to the I/O interfaces 32 and 52 and fetch the pending read transactions as illustrated in FIG. 5B. For a normal integrity write the write transaction may only be passed to the I/O interface being addressed. The I/O interface may complete the transaction write A and the data conformers 30 and 50 may pass the transaction read A to the I/O interface 32 and 52 as illustrated in FIG. 5C. For a normal integrity read, transaction read A may only be passed to the I/O Interface being addressed.

Figure 6A:
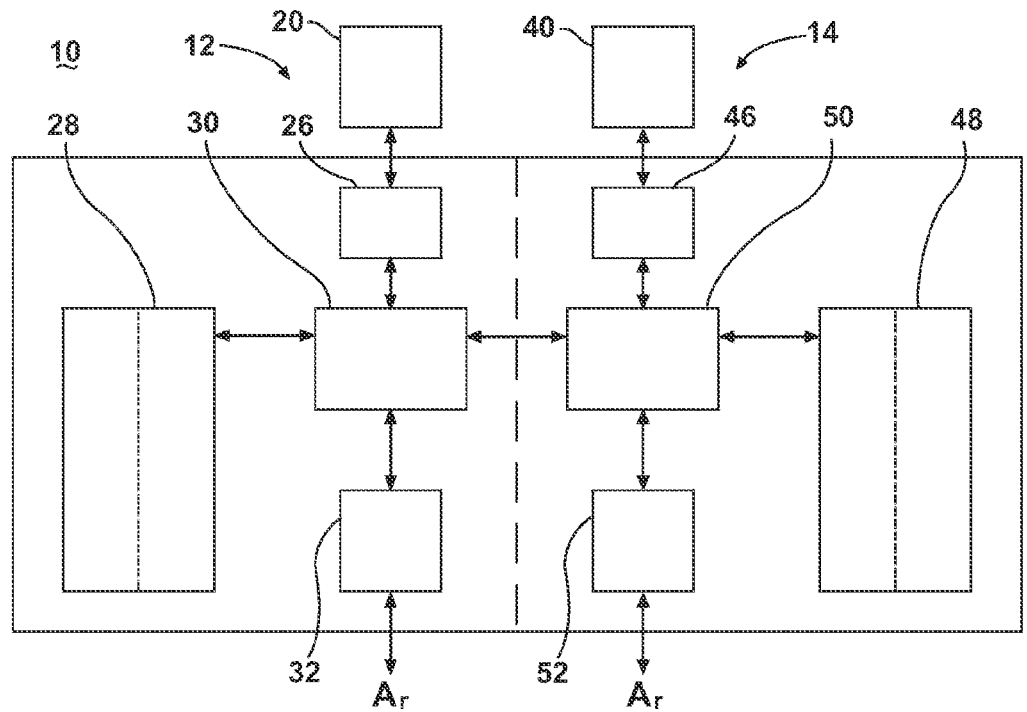
FIGS. 6A-6F schematically illustrate another portion of the method of providing synchronization and integrity checking in a high integrity processing system, according to the second embodiment.
Figure 6B:
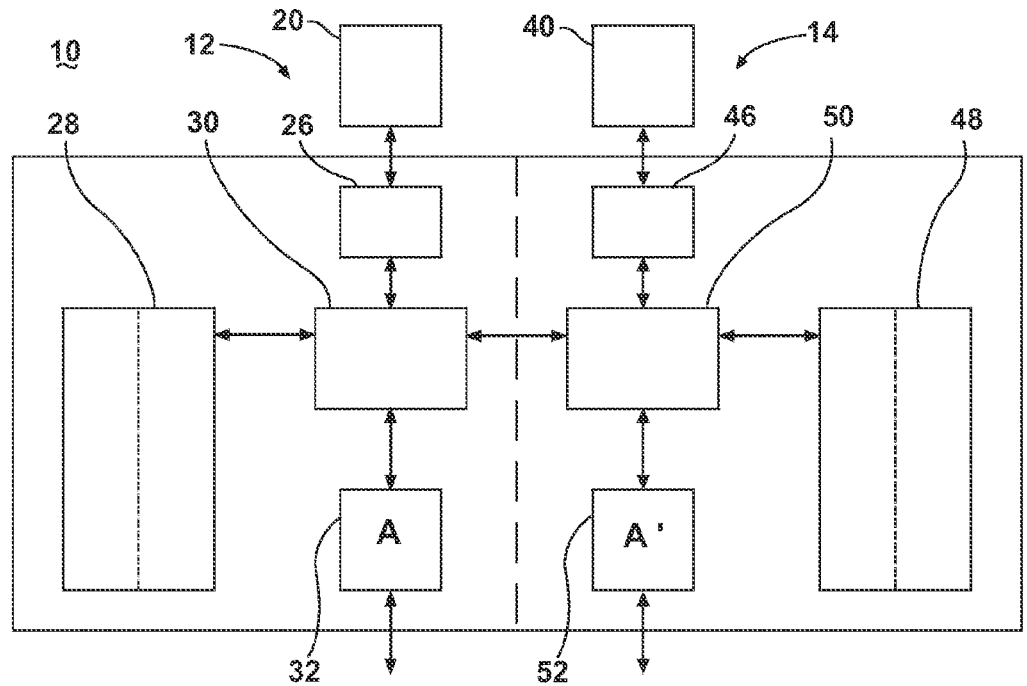
Figure 6C:
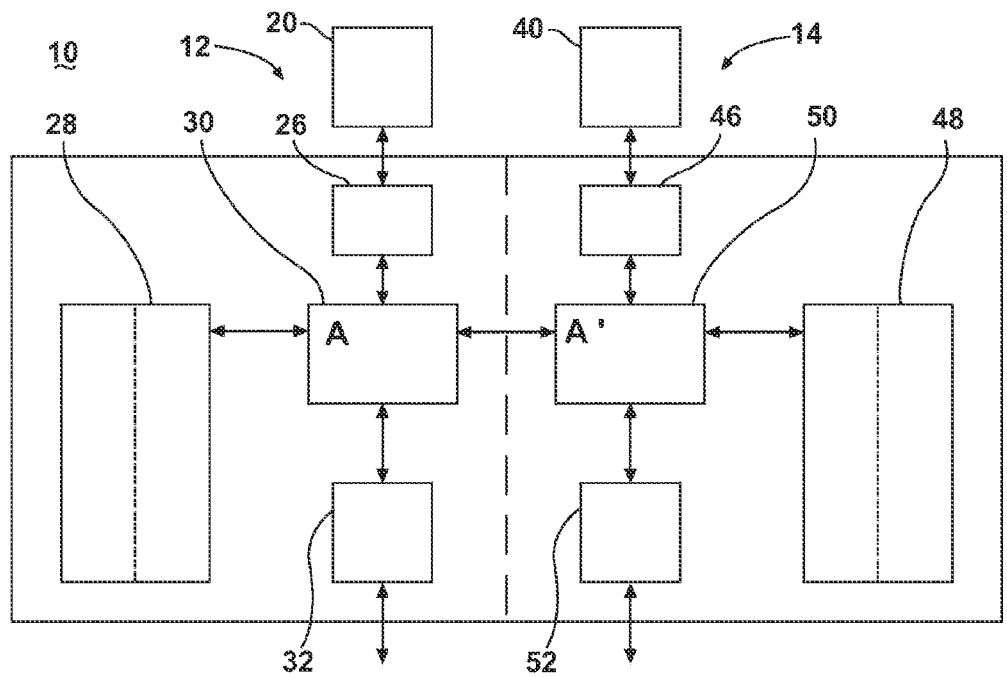
Figure 6D:
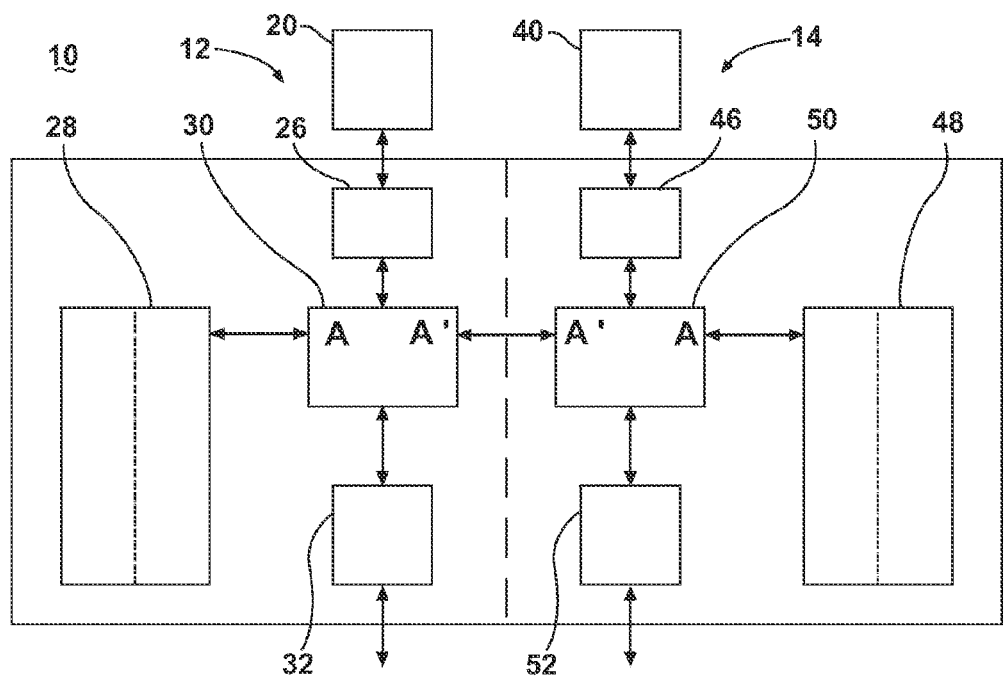
Figure 6E:
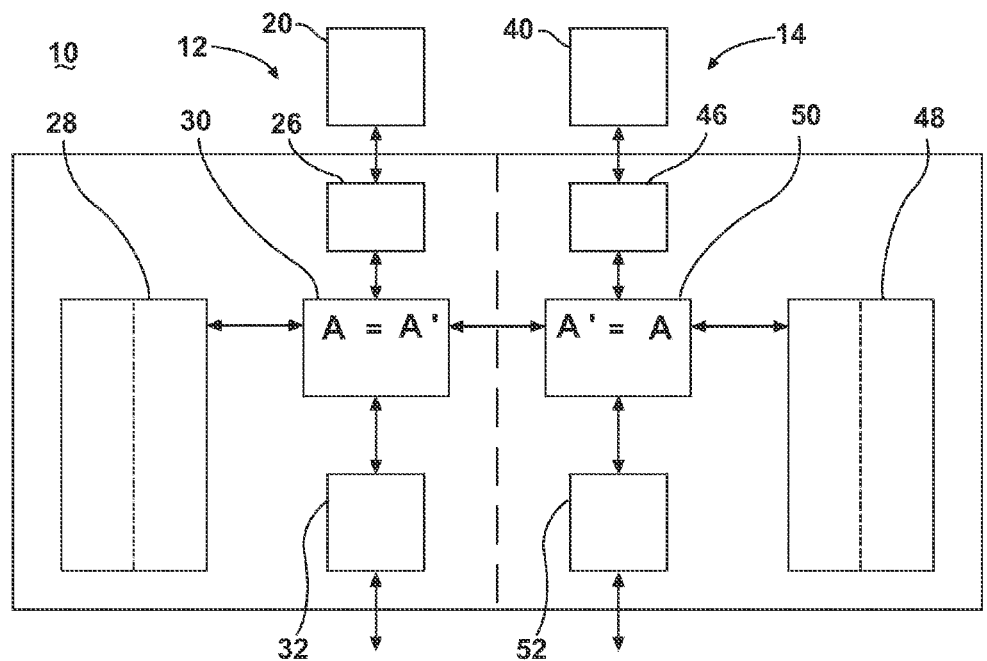
Figure 6F:
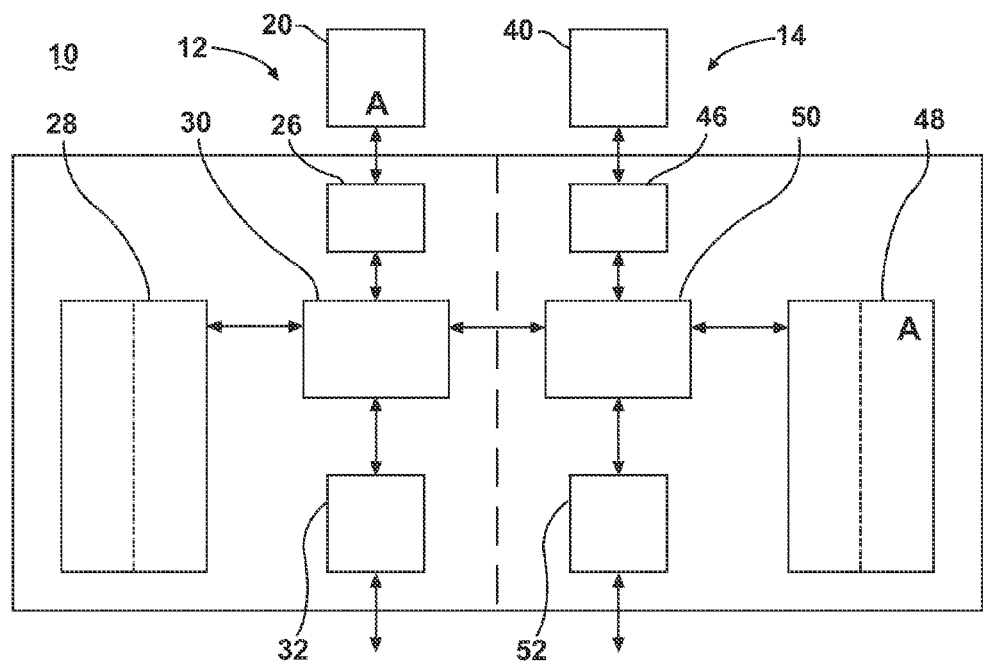

FIGS. 6A-6F illustrate the read data being verified. FIG. 6A illustrates that the I/O interfaces 32 and 52 may complete the transaction read of data A. The I/O Interfaces 32 and 52 may pass the read data to the data conformers 30 and 50 as illustrated in FIG. 6B and FIG. 6C. The data conformers 30 and 50 may pass the read data to each other as illustrated in FIG. 6D and perform a comparison in FIG. 6E. The data conformer 30 may pass read data A to the first CPU 20 and data conformer 50 stores transaction and read data A in the transaction memory 48 for the second CPU 40 to read later as illustrated in 6F. If the comparison had failed then an error may be indicated in the read and the transaction memory 48 and the error would be logged.

Figure 7A:
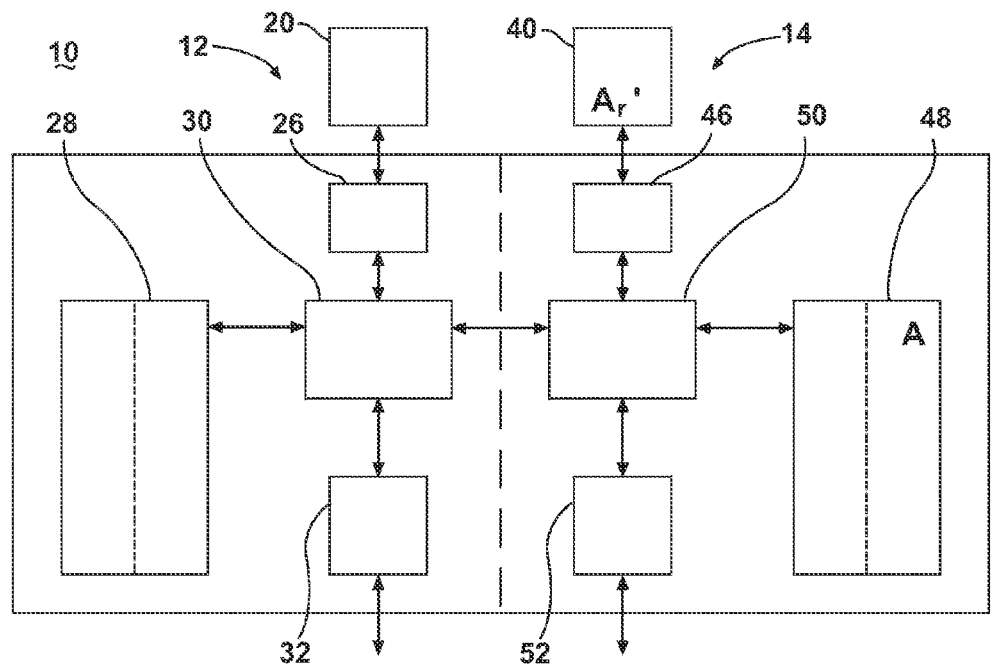
FIGS. 7A-7D schematically illustrate another portion of the method of providing synchronization and integrity checking in a high integrity processing system, according to the second embodiment.
Figure 7B:
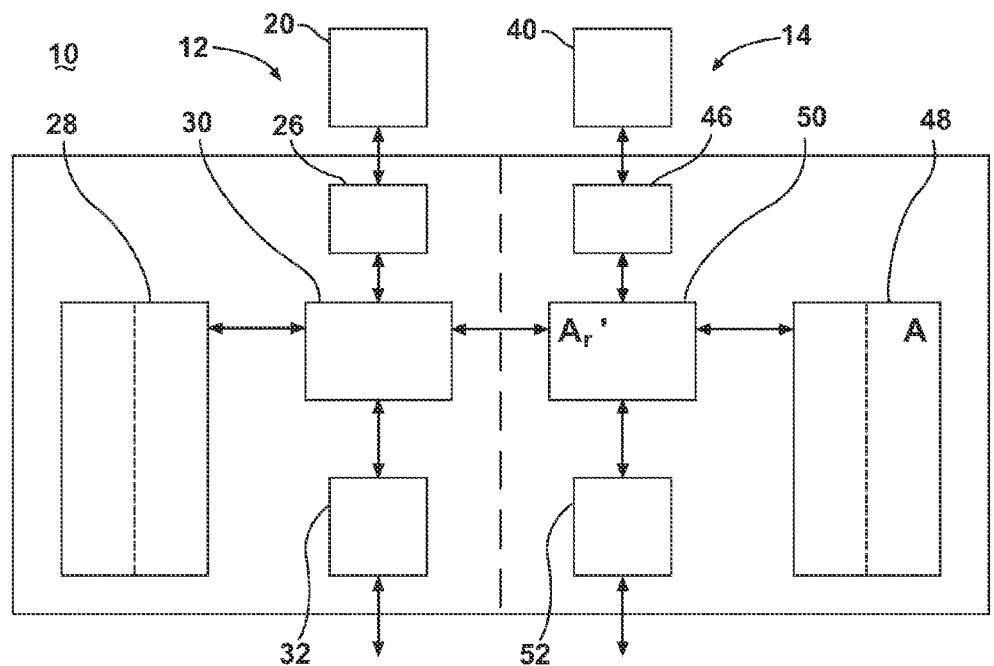
Figure 7C:
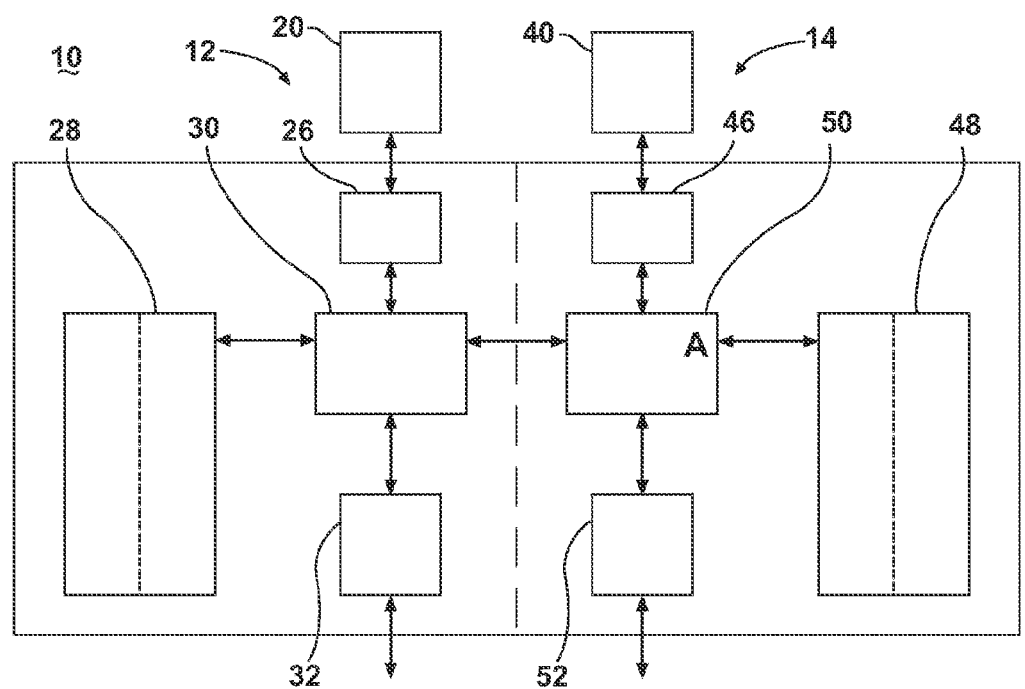
Figure 7D:
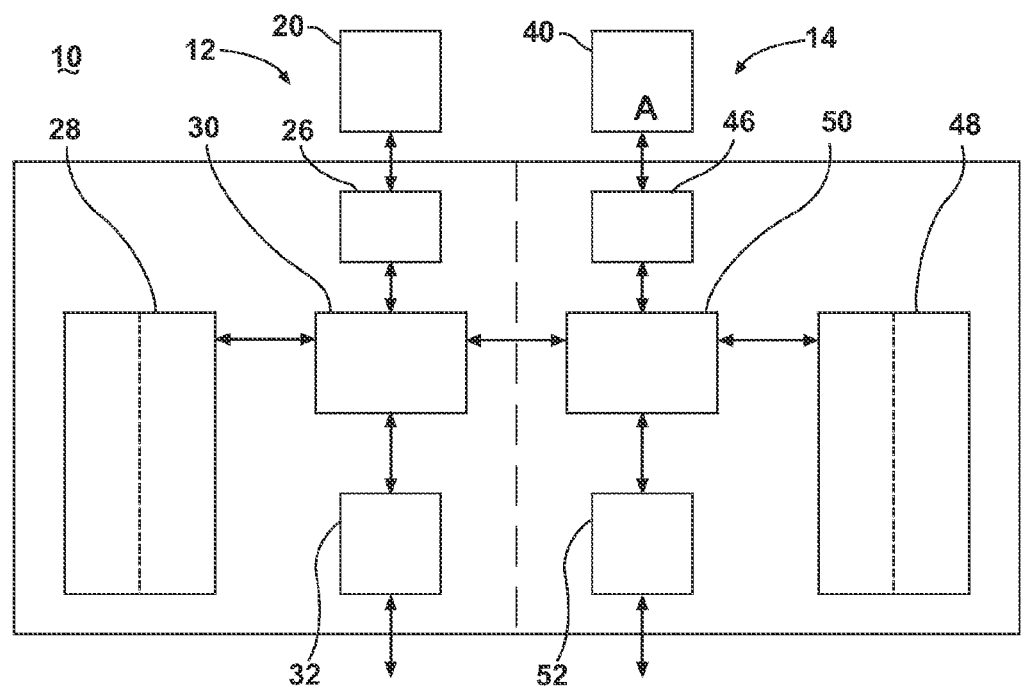

FIGS. 7A-7D illustrate a fourth transaction read access, illustrated as $A_r'$ being generated and compared. More specifically, the second CPU 40 generates a fourth transaction read access $A_r'$, which is illustrated in FIG. 7A as a transaction read access to the same address as the second transaction. The transaction $A_r'$ may be output from the second AP 42 and may be received by the second data conformer 50 as illustrated in FIG. 7B. Because the data conformer 50 may determine that there is an existing verified read from A in the transaction memory 48 the data conformer 50 may retrieve the verified read from A from the transaction memory 48. The data conformer 50 may then send the read Data A to CPU 40 as illustrated in FIG. 7D. If the A=A' comparison had failed earlier than an error would be indicated in the read. In this manner the data conformers 30 and 50 may match up the I/O accesses for the CPUs 20 and 40 using the transaction buffer. Each write access request stays in the buffer or transaction memory until the access request is received from both CPUs 20 and 40 after which time the I/O access is initiated. Each read access returns read data immediately to the CPU that initiated the read transaction first and stores the verified data in the transaction memory until the other CPU initiates the same read transaction. In this manner, when the faster CPU performs a read it is essentially pre-fetching that data for the slower CPU.

FIGS. 8A-8J illustrate an alternative portion of a method according to a third embodiment wherein when there is a non-blocked read the APs may perform the read prior to pending write and blocked read transactions to avoid a performance penalty. Further, the method allows the read data to be available immediately rather than waiting for the corresponding transaction from the redundant processor.

Figure 8A:
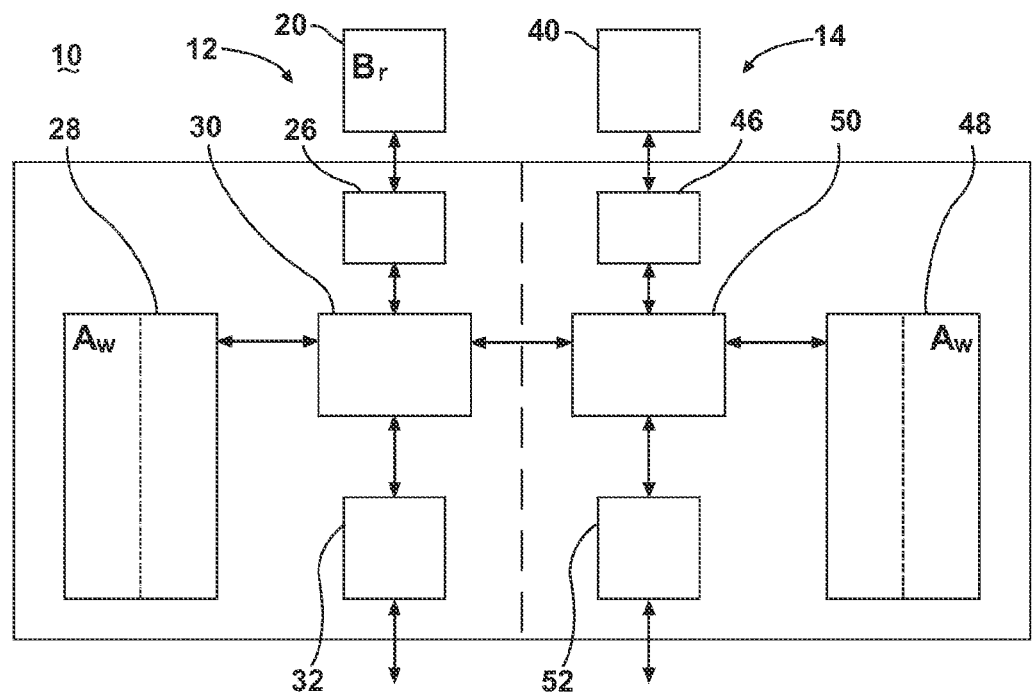
FIGS. 8A-8J schematically illustrate an alternative portion of a method of providing synchronization and integrity checking in a high integrity processing system, according to a third embodiment.
Figure 8B:
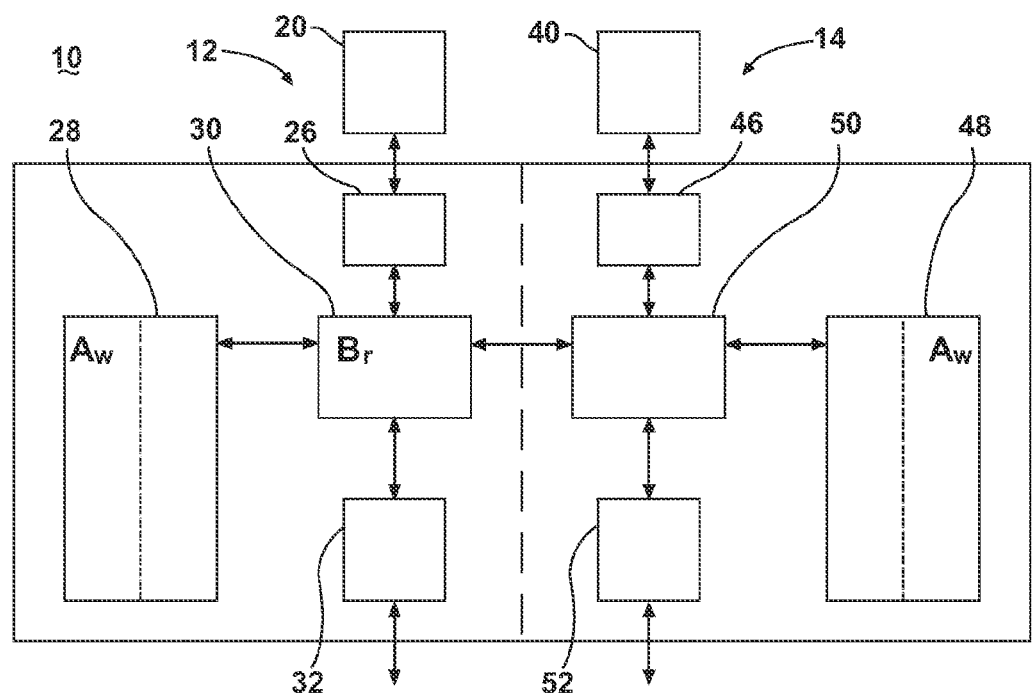
Figure 8C:
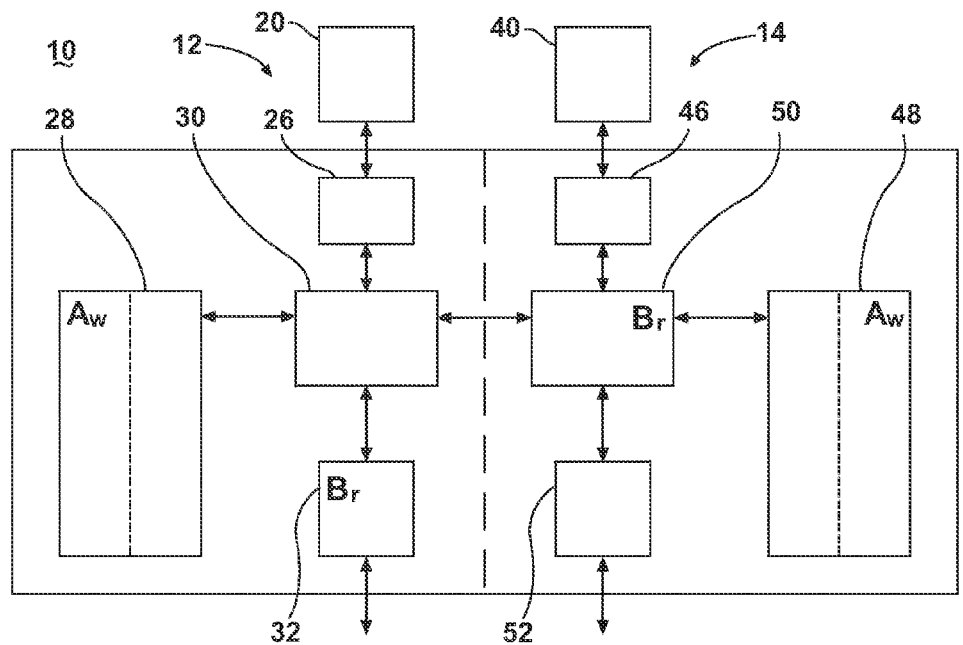
Figure 8D:
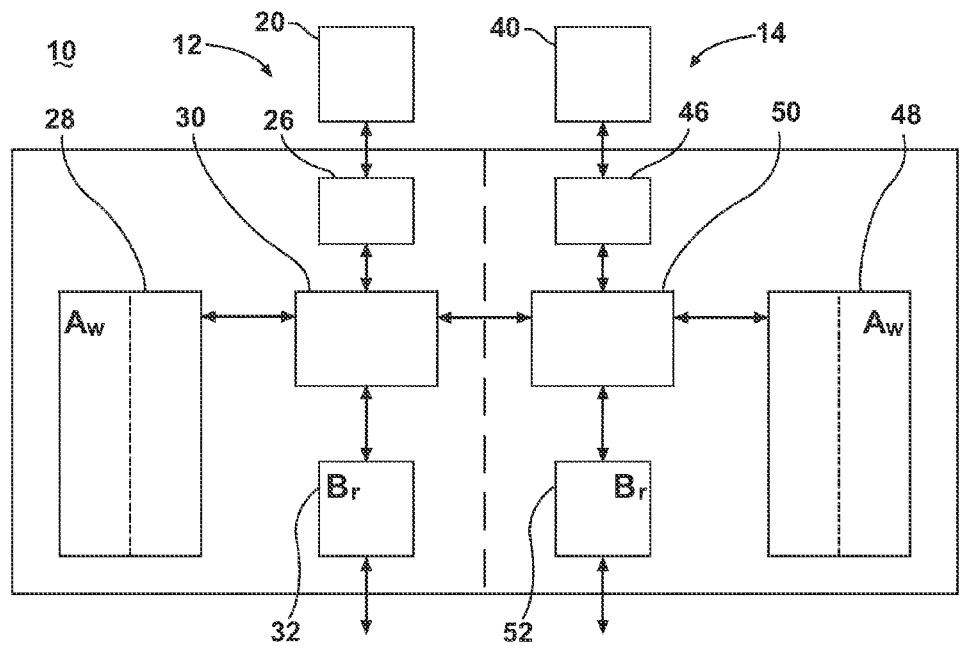

When a read transaction occurs and there is not an existing write to an overlapping region in the transaction memory (the read is not affected by any outstanding write) then the read transaction is a non-blocked read as illustrated in FIG. 8A. The non-blocked read $B_r$ may be received in the first data conformer 30 of the first processing lane 12 as illustrated in FIG. 8B. The data conformer 30 may pass the transaction $B_r$ to the I/O interface 32 and may pass the transaction $B_r$ to the second data conformer 50 as shown in FIG. 8C. The data conformer 50 may then pass the transaction $B_r$ to the I/O interface 52 as illustrated in FIG. 8D.

Figure 8E:
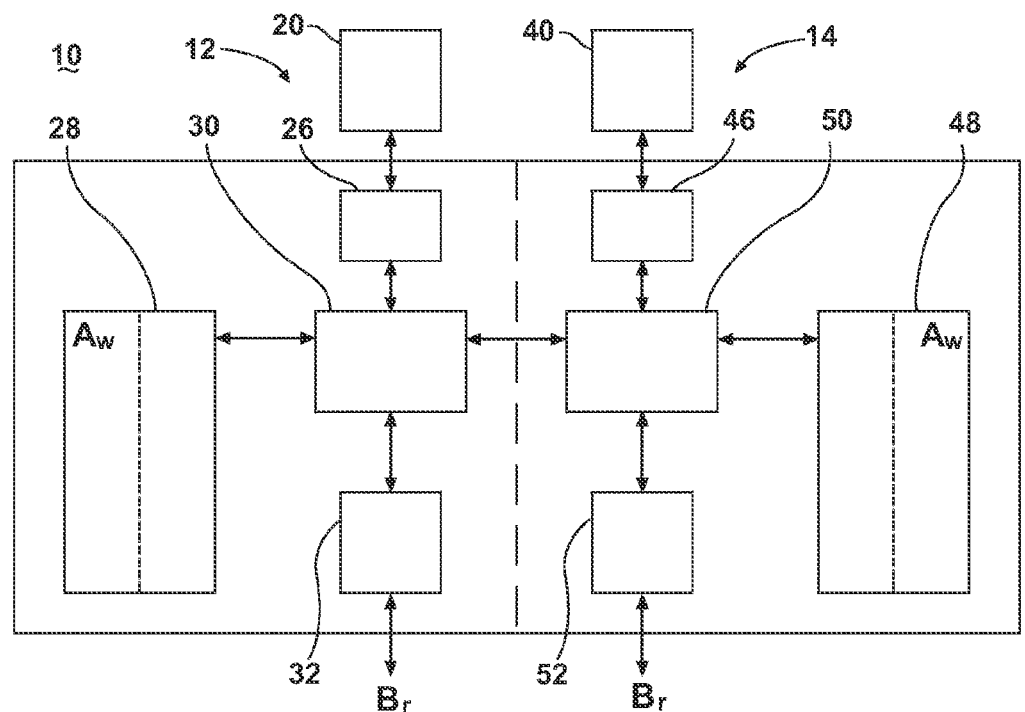
Figure 8F:
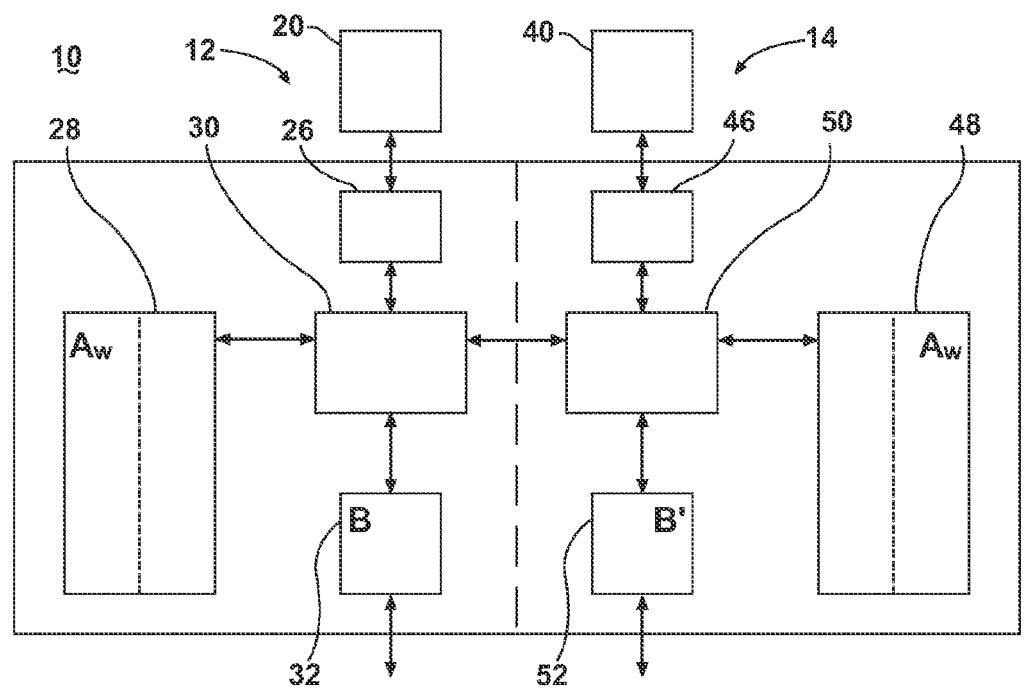
Figure 8G:
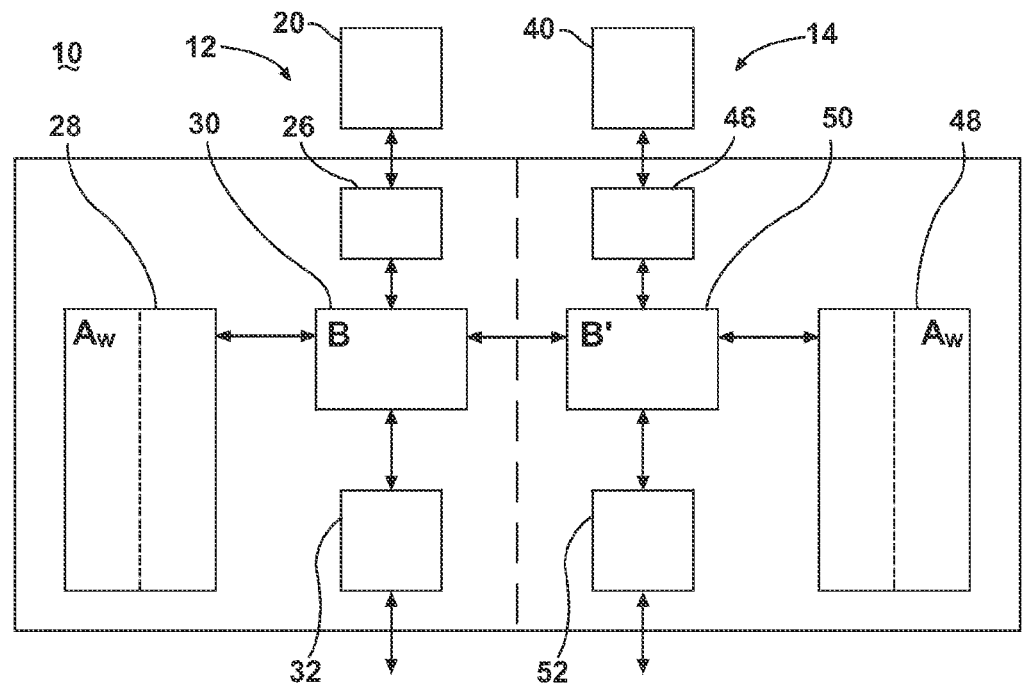
Figure 8H:
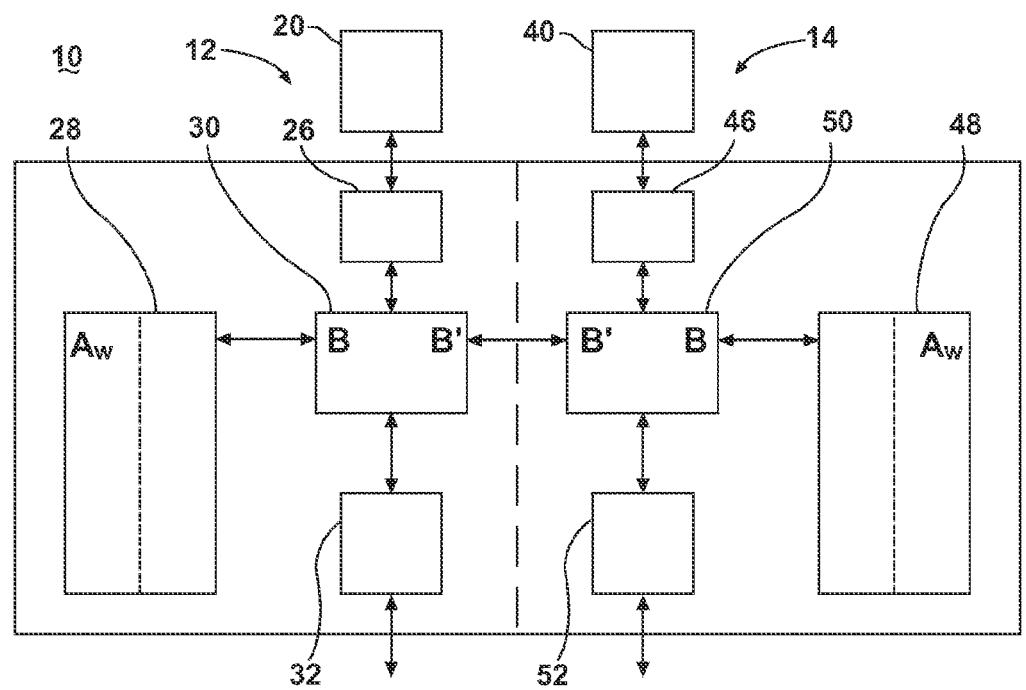
Figure 8I:
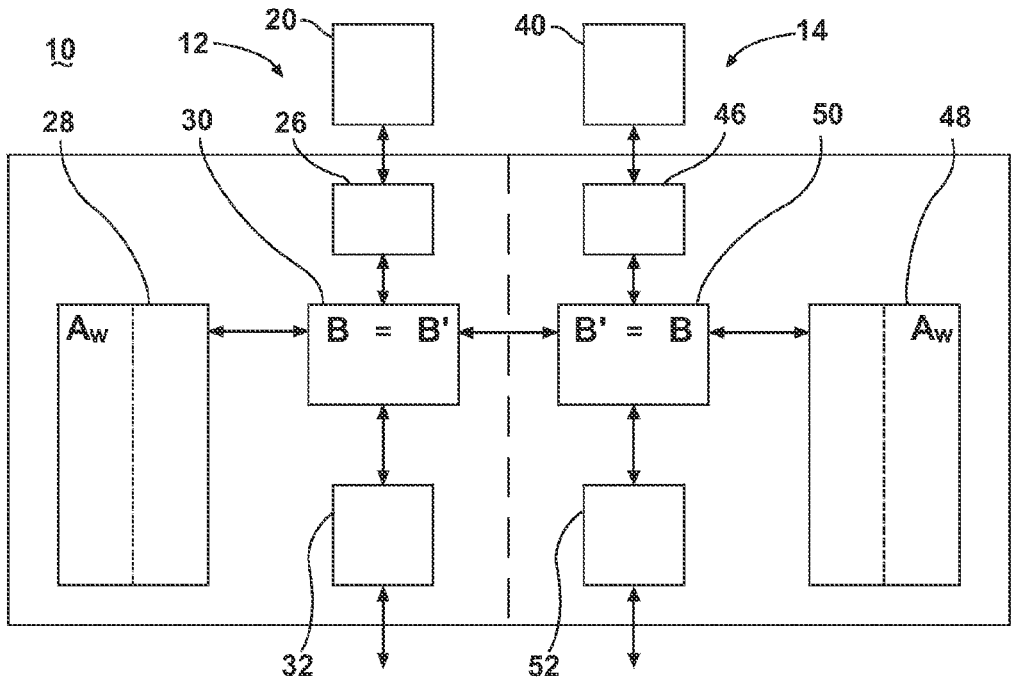
Figure 8J:
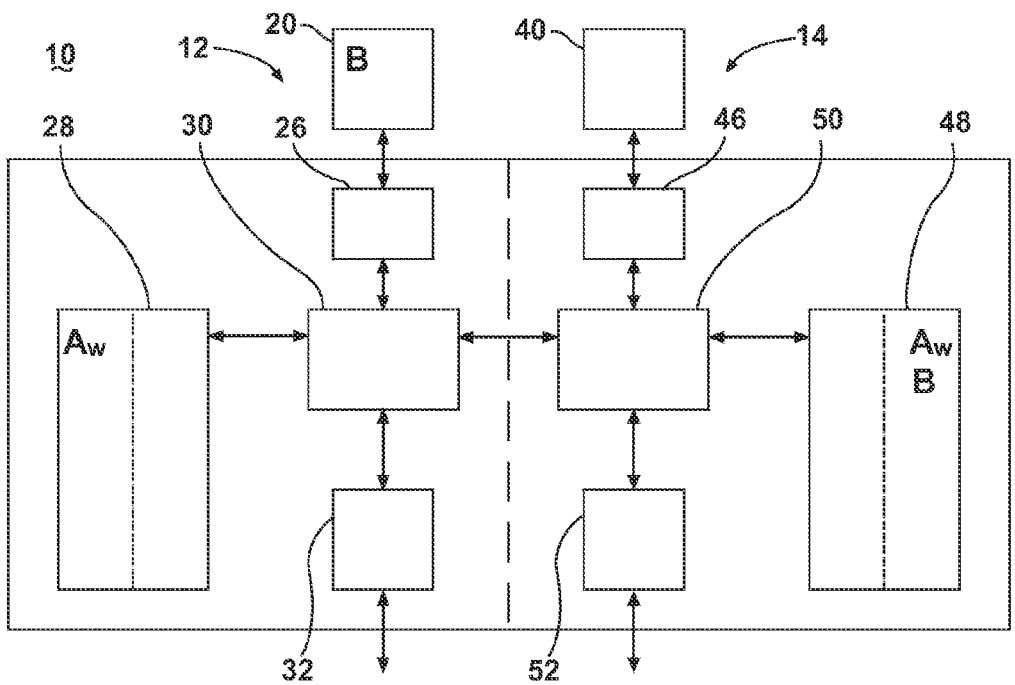

FIG. 8E illustrates that the I/O interfaces 32 and 52 may perform the read and the I/O Interfaces 32 and 52 may pass the read data to the data conformers 30 and 50 as illustrated in FIG. 8F and FIG. 8G. The data conformers 30 and 50 may pass the read data to each other as illustrated in FIG. 8H and perform a comparison in FIG. 8I. The data conformer 30 may pass read data B to the first CPU 20 and data conformer 50 stores transaction and read data B in the transaction memory 48 for the second CPU 40 to read later as illustrated in FIG. 8J. If the reads do not match, the read is flagged as erroneous. The Data Conformers that did not source the read hold the verified read data until their associated processor performs the read.

In the case where there is a partition and there is a transaction pending in the buffer at the time of a partition switch, it may remain in that buffer until the system returns to that partition. In this case, a set of transaction memory is maintained for each partition and the data conformer switches to the new transaction memory set at each partition switch. The transaction synchronization may continue to function as normal for each partition and the pending transaction is completed after switching back to the original partition. Even though the transaction was delayed until returning to that partition, from the perspective of the other CPU there was no delay. The system always runs at least as fast as the slowest CPU and may run slightly faster due to the fact that read data is always ready for the slower CPU. If it is undesirable to have transactions delayed into the next partition, then it is up to the software to make sure it has enough time to finish the transaction based on the partition timer.

The above described embodiments allow for a variety of benefits. For example, the above described embodiments allow for the synchronization of modern processors without impacting performance. The technical effect is that such synchronization and integrity checking does not require lockstep operation and allows for dissimilar processors with the processing system running at least as fast as the slowest processor. Processor synchronization is transparent to the software applications. The synchronization and integrity checking may be implemented in either hardware or software allowing flexibility in the implementation. Further, the above described methods may be used in systems having multiple redundancies and for multiple processors/threads. The use of dissimilar processors provides a higher degree of safety and value for the customer. Another benefit is that the safety analysis of the system can be greatly simplified due to the isolation of the safety analysis to the processing module, which results in reducing system cost and development time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of providing synchronization and integrity checking in a high integrity processing system having at least two redundant processing lanes, with each lane having an application processor (AP), with the APs running the same application software in a non-lockstep configuration, and outputting transactions requiring access to an addressable space, the method comprising:

outputting a first transaction from a first AP running application software in a non-lockstep configuration;

storing the first transaction in a first buffer associated with the first AP prior to executing the first transaction;

storing the first transaction in a second buffer associated with a second AP outputting a second transaction from the second AP running the same application software in a non-lockstep configuration;

storing the second transaction in the second buffer;

comparing the first and second transactions to determine if they match; and effecting a processing of the first and second transactions in their corresponding lane when they match.

2. The method of claim 1, further comprising logging an error in memory when the first and second transactions do not match.

3. The method of claim 2, further comprising flushing the first buffer when the first and second transactions do not match.

4. The method of claim 1 wherein the storing of the second transaction in the second buffer occurs before the comparing.

5. The method of claim 1 wherein the first transaction is stored in the second buffer prior to the outputting of the second transaction.

6. The method of claim 1 wherein the second transaction is stored in the first buffer.

7. The method of claim 6 wherein the second transaction is stored in the first buffer prior to the comparing.

8. The method of claim 6 wherein the comparison comprises popping the first and second transactions off of the first and second buffers and then comparing the popped off first and second transactions.

9. The method of claim 8 wherein when the first transaction comprises a write access and the second transaction comprises a read access to the same address as the write access, the second transaction is stored in the second buffer behind the first transaction.

10. The method of claim 9, further comprising outputting a third transaction from the second AP and when the third transaction comprises a write access to the same address as the first transaction, the first and third transactions are popped from the first buffer and the comparison is made between the first and third transaction instead of the first and second transactions.

11. The method of claim 1, further comprising receiving the first transaction in a first data conformer corresponding to the first AP.

12. The method of claim 11 wherein storing the first transaction in a buffer comprises storing the first transaction in a first transaction memory corresponding to the first data conformer.

13. The method of claim 12, further comprising passing the first transaction to a second data conformer for the second AP and storing the first transaction in a second transaction memory corresponding to the second data conformer.

14. The method of claim 13, further comprising receiving the second transaction in the second data conformer.

15. The method of claim 14, further comprising passing the second transaction to the first transaction memory.

16. The method of claim 15, further comprising popping the first and second transactions from the first and second transaction memories and then conducting the comparing.

17. The method of claim 15 wherein when the first transaction comprises a write access and the second transaction comprises a read access to the same address as the write access, the second transaction is stored in the first and second transaction memories behind the first transaction.

18. The method of claim 17, further comprising outputting a third transaction from the second AP and when the third transaction comprises a write access to the same address as the first transaction, the third transaction is received by the second data conformer, which saves the third transaction in the second transaction memory and passes the third transaction to the first data conformer, which saves the third transaction in the first transaction memory, and the first and third transactions are popped from the first and second transaction memories and the comparison is made between the first and third transactions instead of the first and second transactions.

19. The method of claim 11, further comprising receiving the first transaction in a plurality of data conformers corresponding to the first AP.

20. The method of claim 19, further comprising receiving the second transaction in a plurality of data conformers corresponding to the second AP and wherein the plurality of data conformers corresponding to the second AP is equal to the plurality of data conformers corresponding to the first AP.

21. The method of claim 1, further comprising flagging an error when the first and second transactions do not match.

22. A method of providing synchronization and integrity checking in a high integrity processing system having at least two redundant processing lanes, with each lane having an application processor (AP), with the APs running the same application software in a non-lockstep configuration, and outputting transactions requiring access to an addressable space, the method comprising:

outputting a first transaction from a first AP running application software in a non-lockstep configuration;

storing the first transaction in a first buffer prior to executing the first transaction;

outputting a second transaction from a second AP running the same application software in a non-lockstep configuration;

comparing the first and second transactions, independently in each processing lane, to determine if they match; and effecting a processing of the first and second transactions in their corresponding lane when they match.

\* \* \* \* \*